United States Patent [19]
Han

[11] Patent Number: 6,049,567
[45] Date of Patent: Apr. 11, 2000

[54] MODE CODING METHOD IN A BINARY SHAPE ENCODING

[75] Inventor: Seok-Won Han, Seoul, Rep. of Korea

[73] Assignee: Daewoo Electronics Co., Ltd., Rep. of Korea

[21] Appl. No.: 08/958,806

[22] Filed: Oct. 27, 1997

[30] Foreign Application Priority Data

Oct. 14, 1997 [KR] Rep. of Korea ................. 97-52446

[51] Int. Cl.[7] ............................ H04N 7/12; H04N 11/02
[52] U.S. Cl. ..................... 375/240; 348/404; 348/415; 348/413; 382/236; 382/239
[58] Field of Search .................... 375/240, 245; 348/404, 403, 402, 415, 413, 411, 699, 700, 398, 384; 382/236, 238, 251, 239, 242, 243, 248; 341/200

[56] References Cited

U.S. PATENT DOCUMENTS

| | | | |
|---|---|---|---|
| 5,883,977 | 3/1999 | Kim .......................... | 348/402 |
| 5,969,764 | 10/1999 | Sun et al. ................. | 348/404 |
| 5,974,184 | 10/1999 | Elfrig et al. ............. | 382/236 |
| 5,978,510 | 11/1999 | Chung et al. ............ | 382/238 |

FOREIGN PATENT DOCUMENTS

| | | | |
|---|---|---|---|
| 2188509 | 9/1987 | United Kingdom ................. | 375/240 |

*Primary Examiner*—Andy Rao
*Attorney, Agent, or Firm*—Anderson Kill & Olick

[57] ABSTRACT

In a mode coding method in encoding a binary alpha block (BAB) within a current frame based on the current frame and a previous frame including a plurality of BAB's, the BAB within the current frame is sub-sampled to generate a sample block and then a reconstructed BAB is reconstructed based on the sample block. In an intra mode, after evaluating the difference between the reconstructed BAB and the BAB, if there is no difference therebetween, a first mode signal is generated and if otherwise, a second mode signal is generated and at the same time a second error data block representing the difference is generated. In an inter mode, besides performing the process in the intra mode described above, a BAB most similar to the BAB within the current frame among the BAB's within the previous frame is detected as a predicted BAB and then the difference between the BAB and the predicted BAB is evaluated. And if there is no difference therebetween, a third mode signal is generated and if otherwise, a fourth mode signal is generated and at the same time a fourth error data block representing the difference is generated. If two or more mode signals among the first to fourth signals are generated, one mode signal among them is selected as a selected mode signal according to a predetermined selection rule.

12 Claims, 8 Drawing Sheets

MODE CODING METHOD IN A BINARY SHAPE ENCODING

FIELD OF THE INVENTION

The present invention relates to a mode coding method; and, more particularly, to a mode coding method in a binary shape encoding.

DESCRIPTION OF THE PRIOR ART

In digital video systems such as video-telephone and teleconference systems, a large amount of digital data is needed to define each video frame signal since the video frame signal comprises a sequence of digital data referred to as pixel values.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects; and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can access and manipulate. A VOP can be referred to as an object and represented by a bounding rectangle whose width and height may be the smallest multiples of 16 pixels (a macroblock size) surrounding each object so that the encoder may process the input video image on a VOP-by-VOP basis, i.e., an object-by-object basis.

A VOP described in MPEG-4 includes shape information and color information consisting of luminance and chrominance data, wherein the shape information is represented by, e.g., a binary mask and related to the luminance data. In the binary mask, one binary value, e.g., 0, is used to designate a pixel, i.e., a background pixel located outside the object in the VOP and the other binary value, e.g., 1, is used to indicate a pixel, i.e., an object pixel inside the object.

A binary shape signal, representing the location and shape of the objects, can be expressed as a binary alpha block (BAB) within a frame or a VOP, e.g., a block of 16×16 binary pixels, wherein each binary pixel has a binary value, e.g., 0 or 1 representing either an object pixel or a background pixel.

A BAB can be encoded by using a conventional bit-map-based shape coding method such as a context-based arithmetic encoding (CAE) method (see *MPEG-4 Video Verification Model Version* 7.0, International Organization for Standardization, Coding of Moving And Associated Audio Information, ISO/IEC JTC1/SC29/WG11 MPEG97/N1642, Bristol, April 1997).

For instance, in an intra mode, a BAB is encoded by using a conventional CAE method to thereby generate an encoded BAB. And in an inter mode, a motion vector representing the displacement between a BAB within a current frame (or VOP) and its most similar BAB within a previous frame (or VOP) together with error data representing the difference therebetween are found by motion estimation and compensation. The error data is encoded by using a conventional CAE method to thereby generate an encoded error data. And then, the encoded error data and the motion vector is combined to thereby generate an encoded BAB.

However, the encoded BAB obtained, such as above, is decoded at a decoder into a reconstructed image which has only a preset resolution. Therefore, if an image for a BAB with a higher resolution is desired, the BAB is conventionally coded with scalability implemented therein which gradually increases resolution of the decoded image for the BAB. That is, a base layer representing an image for a BAB with a lower resolution is coded; and based on the base layer, additional information is added to generate an enhancement layer for the BAB, which is, then, coded.

Meanwhile, according to a conventional binary shape encoding method, e.g., a CAE method to enhance coding efficiency thereof, various mode signals for corresponding BAB's are encoded to thereby providing corresponding encoded mode signals, respectively, to be transmitted to a decoder via a transmitter on a BAB by BAB basis in lieu of encoding all of the binary pixel values within the BAB and transmitting the corresponding encoded binary pixel values.

In detail, for example, if there is an image plane of 160×160 binary pixels within a frame (or a VOP), there exist one hundred BAB's of 16×16 binary pixels and each of BAB's includes 256 number of binary pixels therein. Therefore, 256 number of data bits per one BAB are necessary to transmit binary shape information representing whether each of binary pixels within a BAB is an object pixel or a background pixel without data loss therein. This is very ineffective in view of coding efficiency. Hence, it is necessary to enhance coding efficiency for a BAB by using temporal and/or spatial correlations between binary pixels within the BAB.

However, since there is limitation in improving or enhancing coding efficiency in encoding binary pixels within a BAB by employing temporal and/or spatial correlations between the binary pixels within the BAB, it is desirable to improve the coding efficiency by encoding a mode signal representing or characterizing a corresponding encoding condition for the BAB to thereby generating and then transmitting a corresponding encoded mode signal.

For example, in case that all of the binary pixels within a BAB are object pixels, in stead of encoding all of the binary pixel values to generate encoded binary pixel values to be transmitted, a mode signal informing or representing that all of the binary pixels within the BAB are object pixels is encoded to thereby generate a corresponding encoded mode signal to be transmitted. By employing the method described above, it is possible to enhance the coding efficiency by transmitting the corresponding encoded mode signal as binary shape information for the BAB that 256 number of binary pixels within the BAB represent. In this respect, a conventional mode coding method is described hereinafter.

According to a conventional mode coding method, in encoding a BAB, one mode signal among 7 number of mode signals stated below is encoded into a corresponding encoded mode signal to be transmitted. The 7 number of mode signals are described below.

Namely, there are a first mode signal representing that in an inter mode, a motion vector is zero and an encoding has been carried out; a second mode signal representing that in the inter mode, the motion vector is not zero and the encoding has been carried out; a third mode signal representing that in the inter mode, the motion vector is zero and the encoding has not been carried out; a fourth mode signal representing that in the inter mode, the motion vector is not zero and the encoding has not been carried out; a fifth mode signal representing that in an intra mode, the encoding has been carried out; a sixth mode signal representing that all of the binary pixels within the BAB are object pixels, respectively; and a seventh mode signal representing that all of the binary pixels within the BAB are background pixels, respectively (see MPEG-4 Video Verification Model Version 7.0, International Organization for Standardization, Coding of Moving And Associated Audio Information, ISO/IEC JTC1/SC29/WG11 MPEG97/N1642, Bristol, April 1997, pp 20–21).

Figure 1:
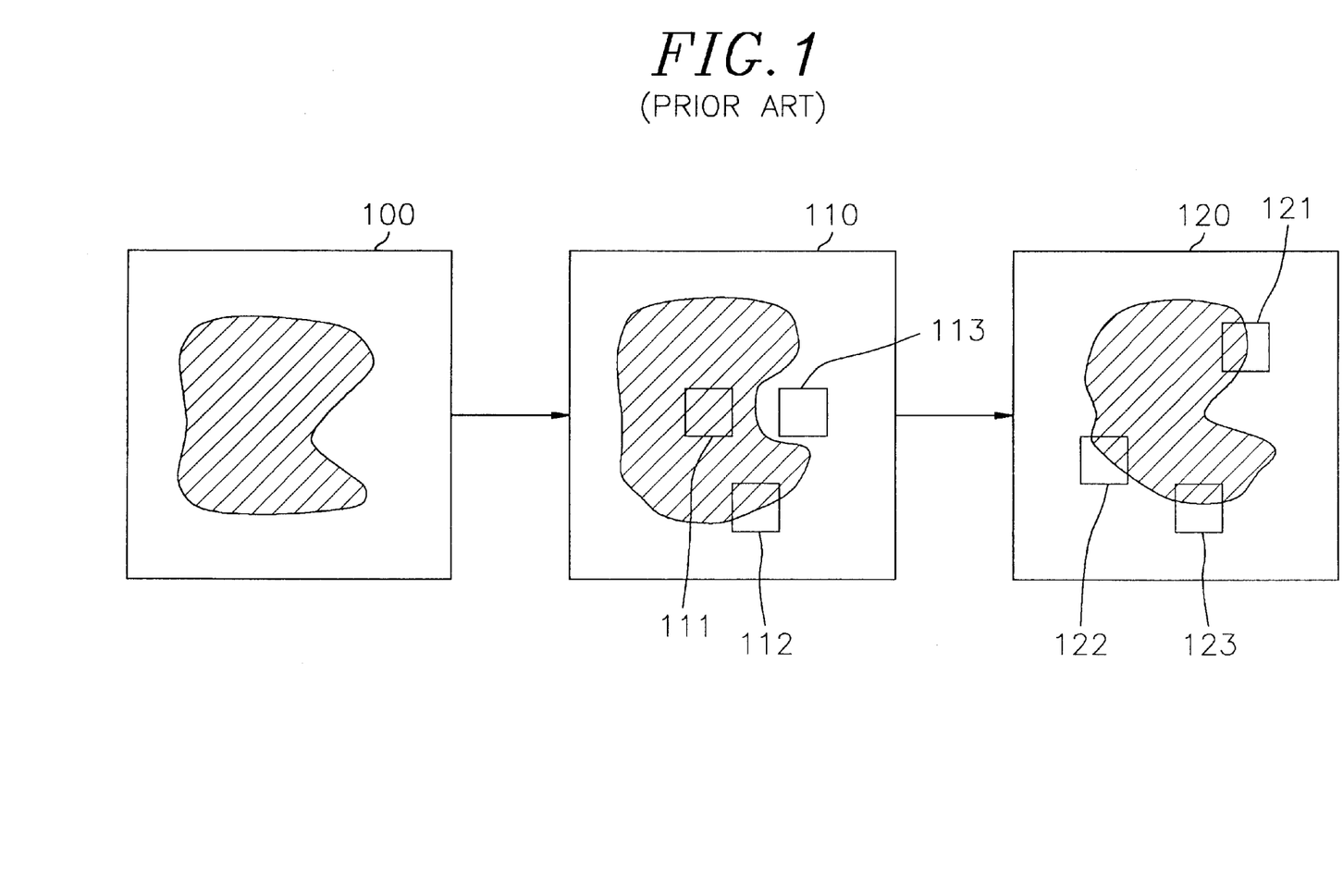
FIG. 1 shows an intra-coded image plane and inter-coded image planes for use in describing a conventional mode coding method in a binary shape encoding.

Referring to FIG. 1, there is shown an intra-coded VOP and inter-coded VOP's for use in describing a conventional mode coding method in a binary shape encoding. In FIG. 1, there are shown an intra-coded VOP 100 and predictive-coded VOP's 110 and 120. The VOP 110 includes BAB's 111, 112 and 113; and the VOP 120 includes BAB's 121, 122 and 123, wherein a hatched region and a unhatched region within each of the VOP's represent an object and a background, respectively.

The fifth mode signal is allocated or provided to each of the BAB's within the VOP 100 since the VOP 100 is an intra-coded VOP. The seventh and the sixth mode signals are allocated to the BAB 111 and the BAB 113 within the VOP 110, respectively, since the BAB 111 and the BAB 113 include only object pixels and only background pixels therein, respectively.

If a corresponding motion vector representing the displacement between the BAB 112 within the VOP 110 and a BAB (stated below as a first predicted BAB) most similar to the BAB 112 within the VOP 100 which is a previous VOP of the VOP 110 is zero and if there are differences between binary pixel values of the BAB 112 and corresponding binary pixel values of the first predicted BAB and hence the differences are encoded, the first mode signal is allocated to the BAB 112.

If a corresponding motion vector representing the displacement between the BAB 121 within the VOP 120 and a BAB (stated below as a second predicted BAB) most similar to the BAB 121 within the VOP 110 which is a previous VOP of the VOP 120 is not zero and if there are differences between the binary pixel values in the BAB 121 and the corresponding binary pixel values in the second predicted BAB and hence the differences are encoded, the second mode signal is allocated to the BAB 121.

If a corresponding motion vector representing the displacement between the BAB 122 within the VOP 120 and a BAB (stated below as a third predicted BAB) most similar to the BAB 122 within the VOP 110 is zero and if there is no difference between the binary pixel values in the BAB 122 and the corresponding binary pixel values in the third predicted BAB and hence the difference is not encoded, the third mode signal is allocated to the BAB 121.

And if a corresponding motion vector representing the displacement between the BAB 123 within the VOP 120 and a BAB (stated below as a fourth predicted BAB) most similar to the BAB 123 within the VOP 110 is not zero and if there are differences between the binary pixel values in the BAB 123 and the corresponding binary pixel values in the fourth predicted BAB and hence the differences are encoded, the fourth mode signal is allocated to the BAB 121.

However, even though a conventional mode coding method such as described above can realize a considerable performance enhancement when it is applied to a base layer encoding, but there is limitation in improving coding efficiency when it is applied to an enhancement layer encoding since it can not reflect the characteristics of the enhancement layer encoding therein.

SUMMARY OF THE INVENTION

It is, therefore, a primary object of the invention to provide a mode coding method in a binary shape encoding, which can further increase the coding efficiency.

In accordance with the present invention, there is provided a mode coding method in encoding a binary alpha block (BAB) of M×N binary pixels within a current frame based on the current frame and a previous frame including a multiplicity of BAB's, M and N being positive integers, respectively, wherein each binary pixel has a binary value representing either an object pixel or a background pixel, comprising the steps of: (a) performing sub-sampling on the BAB within the current frame according to a predetermined sub-sampling rule to thereby generate a sample block of (M/K)×(N/K) binary pixels within the current frame, wherein M and N are multiples of K which is a predetermined positive integer, respectively; (b) generating a reconstructed BAB of M×N binary pixels according to a predetermined reconstruction rule based on the sample block within the current frame; (c) evaluating the difference between the reconstructed BAB and the BAB within the current frame, then if there is no difference therebetween, generating a first mode signal informing that there is no difference therebetween and hence the difference is not coded, and if there is the difference therebetween, generating a second mode signal informing that there is the difference therebetween and at the same time generating a second error data block of M×N binary pixels representing the difference to be encoded as an encoded second error data block; (d) in an inter mode, performing sub-sampling on the BAB's within the previous frame according to the predetermined sub-sampling rule to thereby generate a multiplicity of corresponding sample blocks of (M/K)×(N/K) binary pixels within the previous frame; (e) in the inter mode, comparing the sample block within the current frame with the corresponding sample blocks within the previous frame and then detecting a corresponding second sample block most similar to the sample block within the current frame among the corresponding sample blocks within the previous frame as a predicted sample block to thereby produce a motion vector having vertical and horizontal components representing the displacement between the sample block within the current frame and the predicted sample block; (f) in the inter mode, based on the motion vector, detecting a BAB most similar to the BAB within the current frame among the BAB's within the previous frame as a predicted BAB, evaluating the difference between the BAB within the current frame and the predicted BAB, then if there is no difference therebetween, generating a third mode signal informing that there is no difference therebetween and hence the difference is not coded, and if there is the difference therebetween, generating a fourth mode signal informing that there is the difference therebetween and at the same time generating a fourth error data block of M×N binary pixels representing the difference to be encoded as an encoded fourth error data block; and (g) in case that the BAB within the current frame is encoded in an intra mode, since one of the first and the second mode signals is generated in the step (c), providing the generated mode signal in the step (c) as a selected mode signal and in case that the BAB within the current frame is encoded in the inter mode, if one mode signal among the first to the fourth mode signals is produced in the steps (c) and (f), providing the produced mode signal in the steps (c) and (f) as a selected mode signal and if two mode signals among the first to the fourth mode signals are generated at the same time in the steps (c) and (f), selecting and providing one of the two generated mode signals in the steps (c) and (f) as a selected mode signal according to a first predetermined selection rule.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
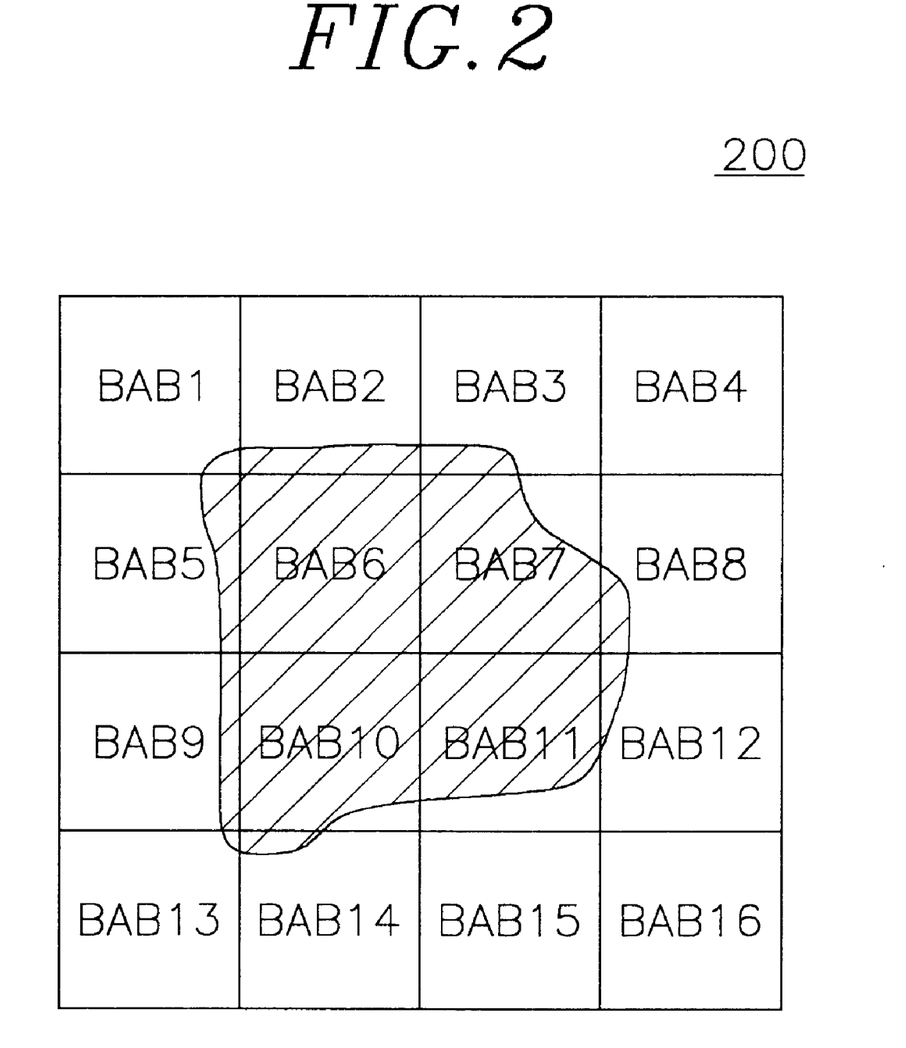
FIG. 2 illustrates a current frame including a multiplicity of binary alpha blocks therein for use in explaining a mode coding method in a binary shape encoding in accordance with the present invention.

In accordance with the present invention, there is provided a mode coding method in a binary shape encoding. In FIG. 2, there is illustrated a current frame 200 including a multiplicity of binary alpha blocks (BAB's) 1 to 16 therein for use in explaining a mode coding method in a binary shape encoding in accordance with the present invention, wherein the hatched and un-hatched regions therein represent an object and a background, respectively. In brief, by performing a mode coding in encoding a binary shape signal, e.g., the current frame including the BAB's 1 to 16, a mode signal (or each of encoded mode signals generated by encoding the mode signals) is allocated or provided to each corresponding BAB of the BAB's 1 to 16.

Figure 3A:
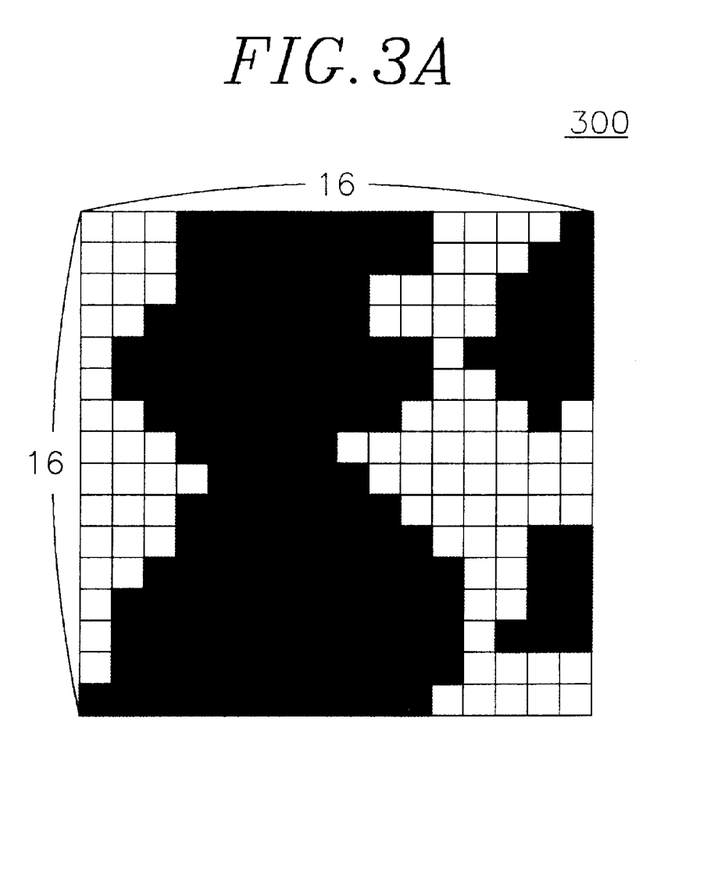
FIGS. 3A to 3I represent blocks and line sets constituting blocks for use in describing a sub-sampling process to generate a base layer of a BAB, reconstruction process to generate a reconstructed BAB based on the base layer and a mode coding process in accordance with the present invention.
Figure 3B:
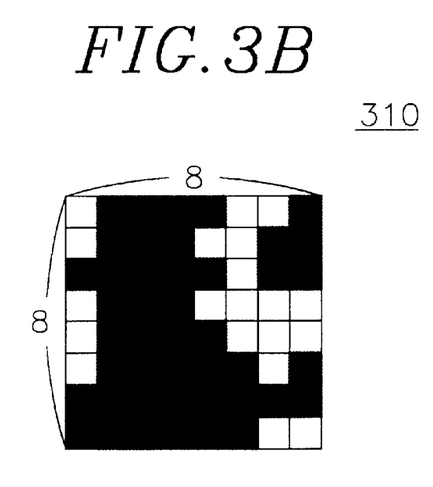

In FIGS. 3A to 3H, there are represented blocks and line sets constituting blocks for use in describing a sub-sampling process to generate a base layer of a BAB and a reconstruction process to generate a reconstructed BAB based on the base layer, wherein the black parts represent object pixels and the white parts represent background pixels. FIG. 3I shows an error data block 380 for use in describing a mode coding method in accordance with the present invention. And in FIG. 4, there are depicted intra-coded frames and inter-coded frames for use in describing a mode coding method in a binary shape encoding in accordance with the present invention. Referring to FIG. 2, FIGS. 3A to 3I and FIG. 4, a mode coding method in a binary shape encoding in accordance with preferred embodiments of the present invention will be described hereinafter.

In accordance with the present invention, there is provided a mode coding method in encoding a BAB of M×N binary pixels within a current frame based on the current frame and a previous frame including a multiplicity of BAB's, M and N being positive integers, respectively, wherein each binary pixel has a binary value representing either an object pixel or a background pixel. It should be noticed here that the current and the previous frames may be replaced by a current video object plane (VOP) and a previous VOP, respectively. For simplicity, only a mode coding method in encoding a BAB within a current frame will be described herein.

First, sub-sampling is performed on the BAB within the current frame according to a predetermined sub-sampling rule to thereby generate a sample block of (M/K)×(N/K) binary pixels as a base layer within the current frame, wherein M and N are multiples of K, respectively, K being a predetermined positive integer. In general, (1/K) is called as a conversion ratio. For example, if a BAB 300 shown in FIG. 3A of which height (M) and width (N) are 16's, respectively, within the current frame is sub-sampled or down-sampled with a conversion ratio (1/2), a sample block 310 as shown in FIG. 3B of which height (M) and width (N) are 8's, respectively, within the current frame is generated.

Thereafter, a reconstructed BAB of M×N binary pixels within the current frame is generated according to a predetermined reconstruction or up-sampling rule based on the sample block within the current frame. For example, a reconstructed BAB 370 of 16×16 binary pixels shown in FIG. 3H is generated according to a predetermined reconstruction rule based on the sample block 310 within the current frame.

Various sub-sampling method may be used as a predetermined sub-sampling method, e.g., a down-sampling method whose conversion ratio is 1/2. As for a reconstruction method, there are also several well known methods including a scan interleaving method employing a context-based arithmetic encoding (CAE) method. Referring to FIGS. 3A to 3H, a sub-sampling method and a reconstruction method in accordance with a preferred embodiment of the present invention are described hereinafter. First, a horizontal sub-sampling step is performed. Namely, every other horizontal lines of a BAB within a current frame, e.g., the BAB 300, is sampled starting from either a first or a second horizontal line of the BAB to generate a first block of (M/2)×N binary pixels, wherein M and N are positive even integers, respectively, and the first horizontal line is a topmost horizontal line of the BAB.

And then a vertical sub-sampling step is performed. Namely, every other vertical lines of the first block is sampled starting from either a first or a second vertical line of the first block to thereby generate a sample block of (M/2)×(N/2) binary pixels, e.g., the sample block 310 of 8×8 binary pixels as shown in FIG. 3B as a base layer, wherein the first vertical line is a leftmost vertical line of the first block.

Thereafter, a reconstructed first block of (M/2)×N binary pixels can be generated by inserting (N/2) number of reconstructed vertical lines sequentially at locations of vertical lines not sampled in the vertical sub-sampling step under the condition that (N/2) number of vertical lines of the sample block are placed at locations of the vertical lines sampled in the vertical sub-sampling step, wherein the reconstructed vertical lines are produced according to a predetermined interpolation rule based on the vertical lines of the sample block.

And then a reconstructed first BAB of M×N binary pixels can be produced by inserting (M/2) number of reconstructed horizontal lines sequentially at locations of horizontal lines not sampled in the horizontal sub-sampling step under the condition that (M/2) number of horizontal lines of the reconstructed first block are placed at locations of the horizontal lines sampled in the horizontal sub-sampling step, wherein the reconstructed horizontal lines are produced according to a predetermined interpolation rule based on the horizontal lines of the reconstructed first block.

Figure 3C:
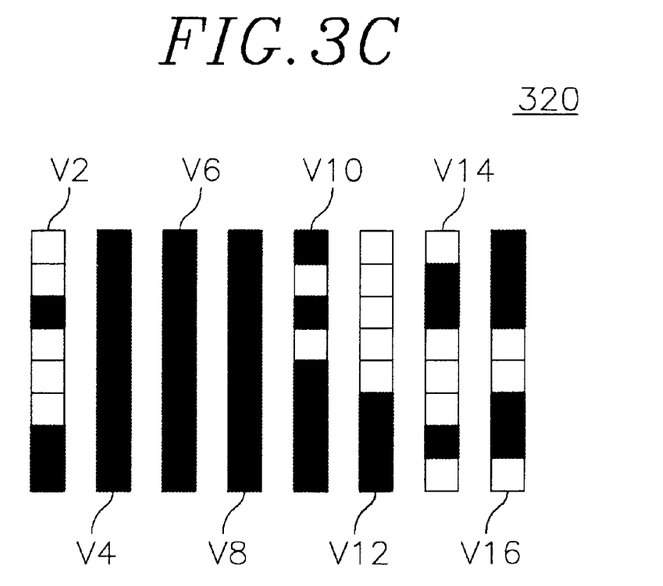
Figure 3D:
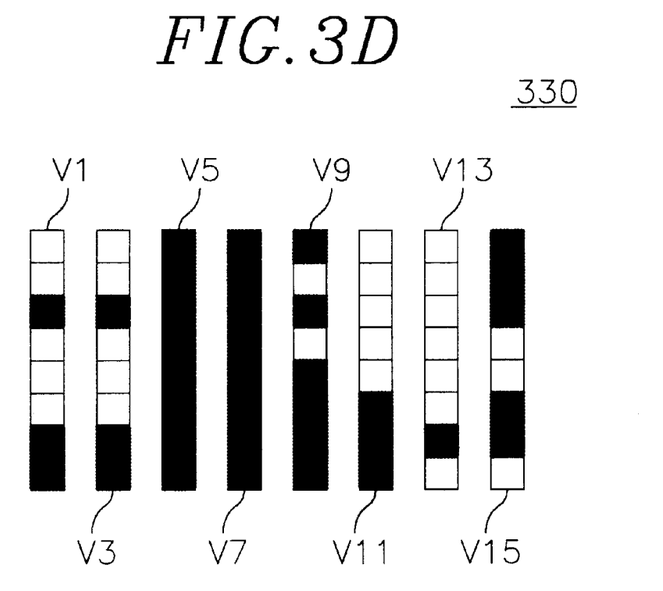
Figure 3E:
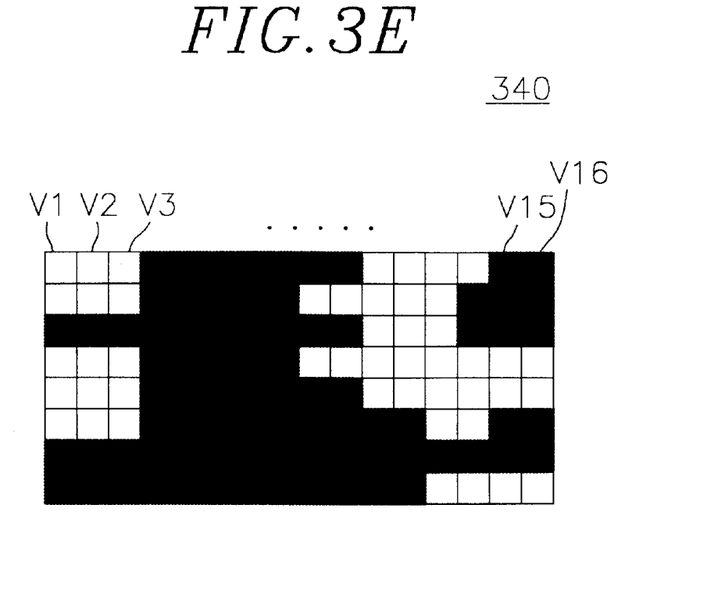
Figure 3F:
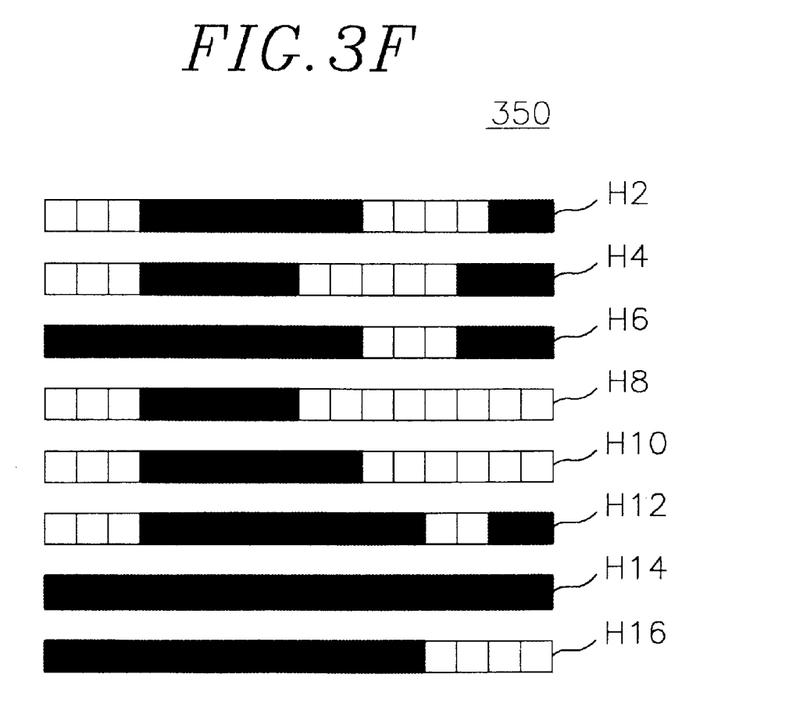
Figure 3G:
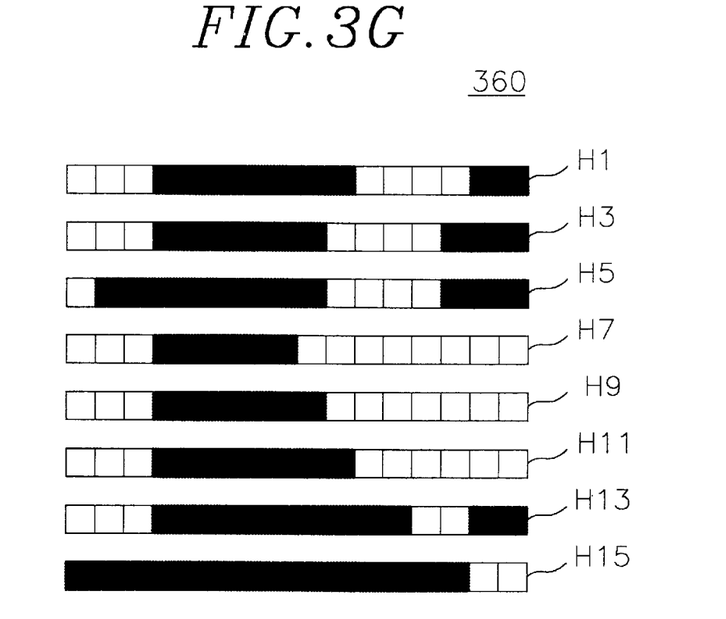
Figure 3H:
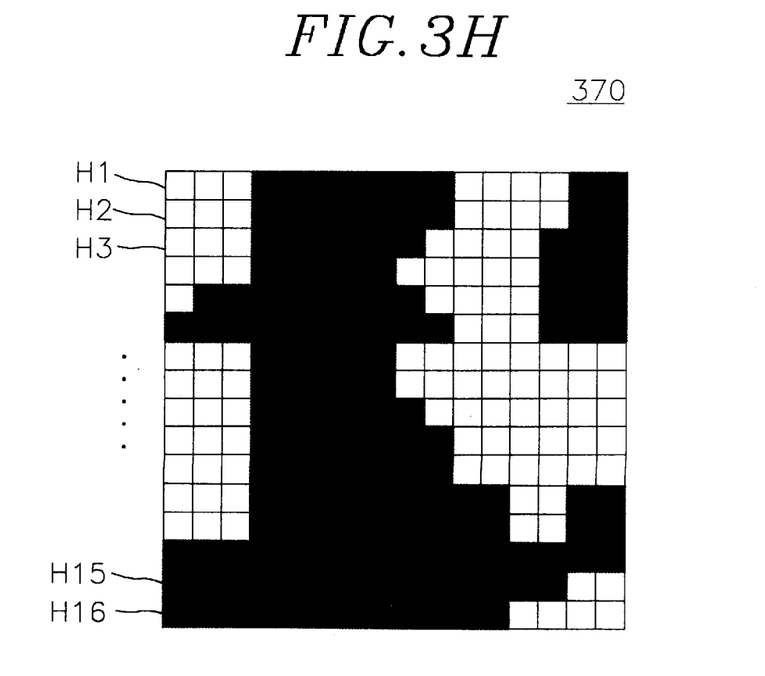
Figure 3I:
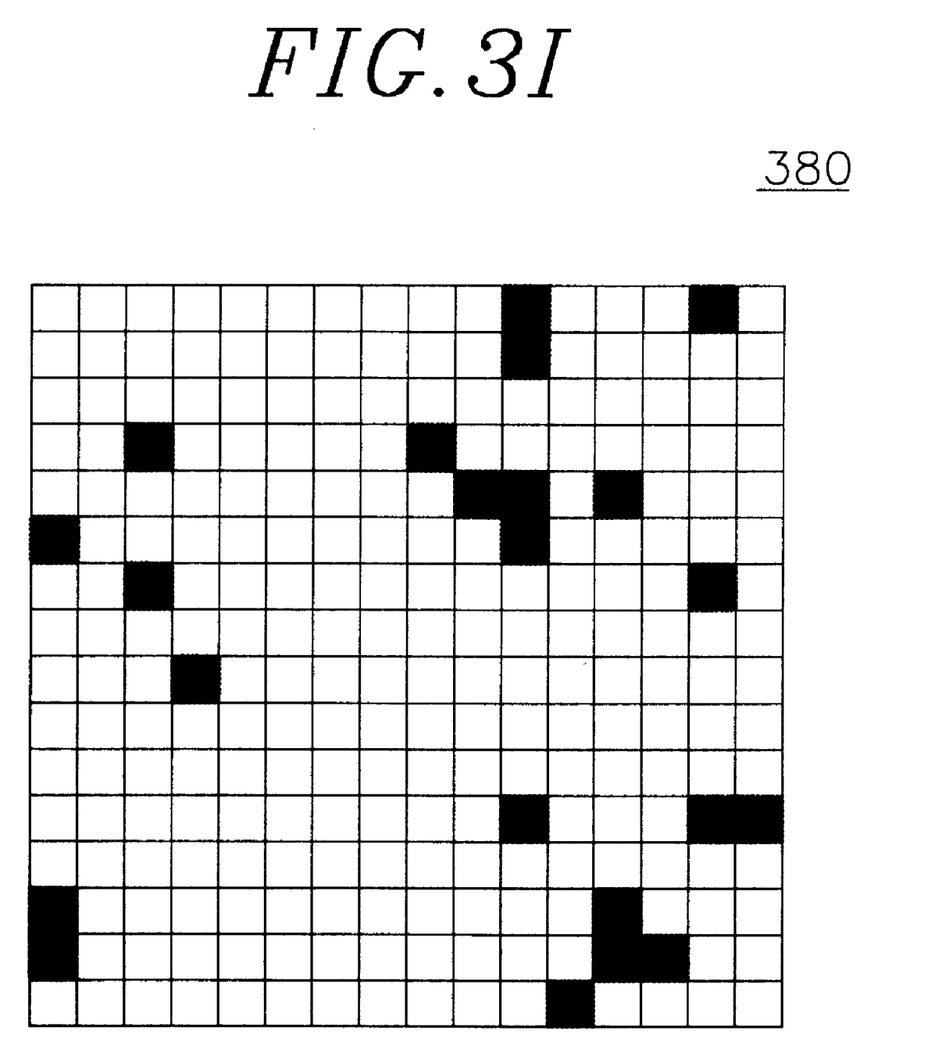

Referring to FIGS. 3C to 3H, there are illustrated blocks and line sets constituting blocks for use in describing a reconstruction process to generate the reconstructed BAB 370 according to a predetermined interpolation rule based on the sample block 310 which is the base layer of the BAB 300. FIG. 3C shows a vertical line set 320 including 8 number of vertical lines of the sample block 310 as 8 number of even numbered vertical lines V2, V4 , . . . , V16. FIG. 3D illustrates a vertical line set 330 including 8 number of odd numbered vertical lines V1, V3 , . . . , V15 reconstructed according to the predetermined interpolation rule based on the vertical line set 320.

And FIG. 3E depicts a reconstructed first block 340 of 8×16 binary pixels generated by inserting the 8 number of vertical lines of the vertical line set 330 sequentially according to the indices assigned thereof as shown in FIG. 3D at odd numbered vertical line locations under the condition that the 8 number of vertical lines of the vertical line set 320 are placed sequentially according to the indices assigned thereof as shown in FIG. 3C at even numbered vertical line locations.

FIG. 3F shows a horizontal line set 350 including 8 number of horizontal lines of the reconstructed first block 340 as 8 number of even numbered horizontal lines H2, H4, . . . , H16. FIG. 3G illustrates a horizontal line set 360 including 8 number of odd numbered horizontal lines H1, H3, . . . , H15 reconstructed according to the predetermined interpolation rule based on the horizontal line set 350.

And FIG. 3H depicts the reconstructed BAB 370 of 16×16 binary pixels produced by inserting the 8 number of horizontal lines of the horizontal line set 360 sequentially according to the indices assigned thereof as shown in FIG. 3G at odd numbered horizontal line locations under the condition that the 8 number of horizontal lines of the horizontal line set 350 are placed sequentially according to the indices assigned thereof as shown in FIG. 3F at even numbered horizontal line locations.

Thereafter, the difference between the reconstructed BAB and the BAB within the current frame is evaluated. And then if there is no difference therebetween a first mode signal is generated, wherein the first mode signal informs that there is no difference therebetween and hence the difference is not coded. If there is the difference therebetween, a second mode signal is generated, wherein the second mode signal informs that there is the difference therebetween. And at the same time, a second error data block of M×N binary pixels representing the difference is generated and in turn the second error data block is encoded as an encoded second error data block.

In detail, referring to FIG. 3I, there is shown a second error data block 380 informing the difference between the BAB 300 within the current frame and the reconstructed BAB 370. In FIG. 3I, the black parts represent binary pixel values, e.g., 1's informing that there are differences between pixels in the BAB 300 and corresponding pixels located at the same position in the reconstructed BAB 370, respectively, and the white parts represent binary pixel values, e.g., 0's informing that there are no differences between pixels in the BAB 300 and corresponding pixels located at the same position in the reconstructed BAB 370, respectively.

Meanwhile, in an inter mode, the process described below is further followed in order to carry out the mode coding in the binary shape encoding in accordance with the preferred embodiments of the present invention. First, a sub-sampling is performed on the BAB's within the previous frame according to the predetermined sub-sampling rule to thereby generate a multiplicity of corresponding sample blocks of (M/K)×(N/K) binary pixels within the previous frame.

Thereafter, the sample block within the current frame is compared with the corresponding sample blocks within the previous frame and then a corresponding sample block most similar to the sample block within the current frame among the corresponding sample blocks within the previous frame is detected as a predicted sample block to thereby produce a motion vector having vertical and horizontal components representing the displacement between the sample block within the current frame and the predicted sample block.

In the inter mode, based on the motion vector, a BAB most similar to the BAB within the current frame is detected among the BAB's within the previous frame as a predicted BAB and then the difference between the BAB within the current frame and the predicted BAB is evaluated. In accordance with the preferred embodiments of the present invention, horizontal and vertical distances between the BAB within the current frame and the predicted BAB produced are two times the horizontal and vertical components of the motion vector, respectively.

Thereafter, if there is no difference therebetween, a third mode signal is generated, wherein the third mode signal informs that there is no difference therebetween and hence the difference is not coded. If there is the difference therebetween, a fourth mode signal is generated, wherein the fourth mode signal informs that there is the difference therebetween. And at the same time, a fourth error data block of M×N binary pixels representing the difference is generated and in turn the fourth error data block is encoded as an encoded fourth error data block.

In the mode coding, in case that the BAB within the current frame is encoded in an intra mode, since one of the first and the second mode signals is generated, the generated mode signal is provided as a selected mode signal. And in case that the BAB within the current frame is encoded in the inter mode, if one mode signal among the first to fourth mode signals is generated, the generated mode signal is provided as a selected mode signal; and if two mode signals among the first to fourth mode signals are produced at the same time, one of the two produced mode signals is selected and provided as a selected mode signal according to a first predetermined selection rule.

The first predetermined selection rule in accordance with a preferred embodiment of the present invention is described hereinafter. If the first and the third mode signals are generated at the same time, one of the first and the third mode signals is selected as a selected mode signal according to a second predetermined selection rule, e.g., a rule selecting the third mode signal. If the first mode signal is generated and the third mode signal is not generated, the first mode signal is selected as a selected mode signal even though the fourth mode signal is generated at the same time.

And if the third mode signal is generated and the first mode signal is not generated, the third mode signal is selected as a selected mode signal even though the second mode signal is generated at the same time. If the second and fourth mode signals are generated at the same time, one of the second and fourth mode signals is selected as a selected mode signal according to a third predetermined selection rule.

The third predetermined selection rule is as follows. First, the second and the fourth mode signals are encoded to thereby generate an encoded second and an encoded fourth mode signals, respectively, and the second and the fourth error data blocks are encoded to thereby generate an encoded second and an encoded fourth error data blocks, respectively. And the encoded second and the encoded fourth mode signals and the encoded second and the encoded fourth error data blocks are combined to thereby generate encoded second and encoded fourth enhancement layer data, respectively.

And then, second and fourth numbers of data bits for the encoded second and the encoded fourth enhancement layer data are calculated, respectively; thereafter, the second number of data bits is compared with the fourth number of data bits to thereby select the second mode signal as a selected mode signal if the second number of data bits is equal to or less than the fourth number of data bits and select the fourth mode signal as a selected mode signal if the second number of data bits is greater than the fourth number of data bits.

According to the mode coding method of the preferred embodiment of the present invention, for example, each selected mode signal (or each encoded selected mode signal obtained by encoding the corresponding selected mode signal) is provided or allocated to each corresponding BAB of the BAB's 1 to 16 within the current frame shown in FIG. 2.

Thereafter, if the first and the third mode signals are selected as selected mode signals, respectively, the first and the third mode signals are encoded as an encoded first and an encoded third mode signals, respectively and then the encoded first and the encoded third mode signals are provided as an encoded first and an encoded third enhancement layers, respectively. And if the second and the fourth mode signals are selected as selected mode signals, respectively, the encoded second and the encoded fourth enhancement layer data are provided as encoded enhancement layers, respectively.

In the above, the mode coding method in accordance with the preferred embodiment of the present invention has been described. It should be noticed here that the mode coding method can be applied on a binary shape encoding, i.e., enhancement layer coding without regard to the kind of the methods, e.g., a sub-sampling method and a reconstruction method of the binary shape encoding.

Figure 4:
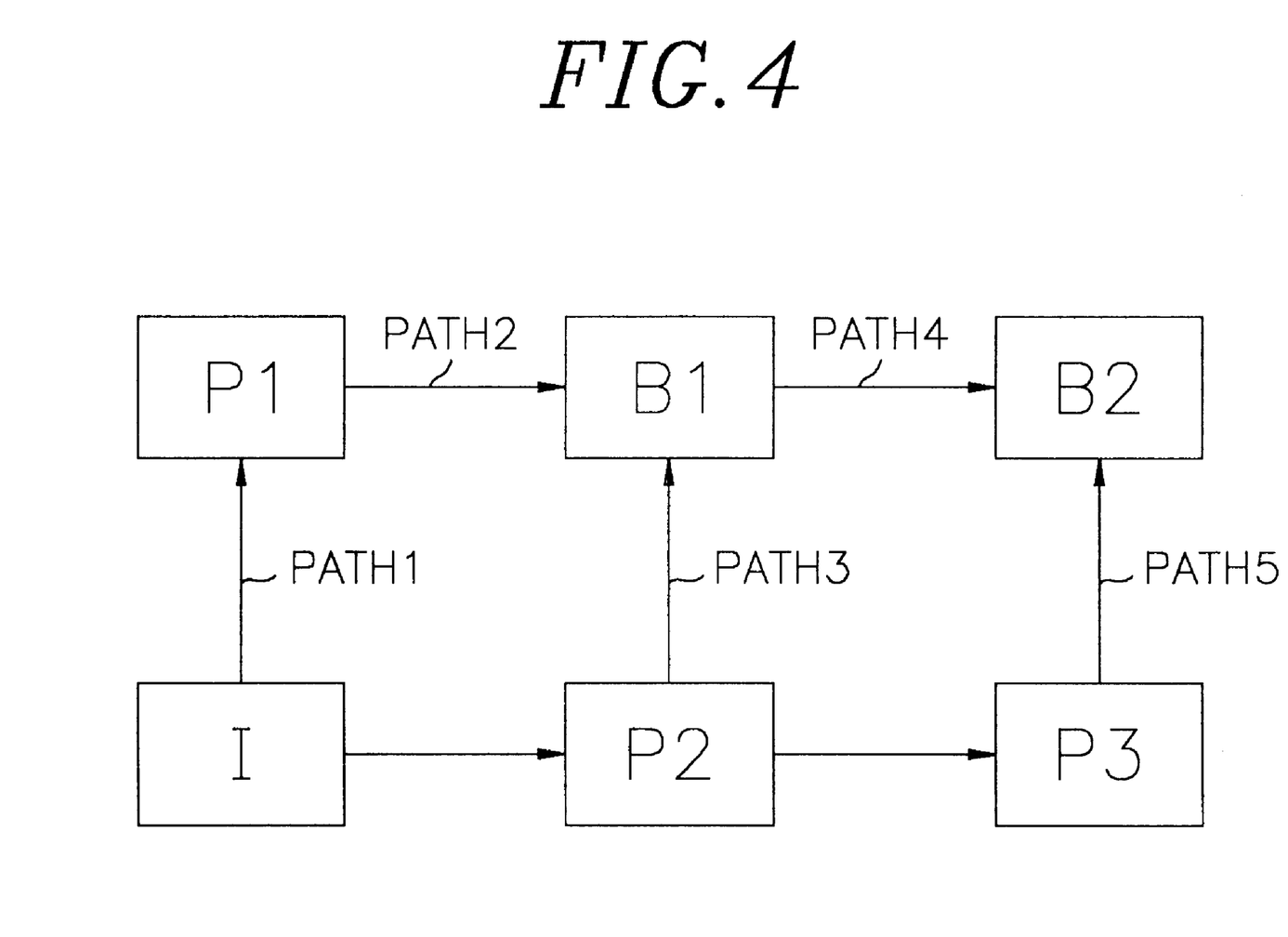
FIG. 4 depicts intra-coded frames and inter-coded frames for use in describing a mode coding method in a binary shape encoding in accordance with the present invention.

FIG. 4 depicts intra-coded frames and inter-coded frames for use in describing the mode coding method in accordance with the preferred embodiment of the present invention. Referring to FIG. 4, the mode coding method applied thereto is described hereinafter. In FIG. 4, I represents an intra-coded frame as a base layer; P1 represents an intra-coded frame as an enhancement layer; P2 and P3 represent intra-coded frames as base layers, respectively; and B1 and B2 represent inter-coded frames as enhancement layers, respectively. In FIG. 4, the frame I is the base layer of the frame P1; the frames P2 and P3 are base layers of the frames B1 and B2, respectively.

The mode coding method in accordance with the preferred embodiment of the present invention is related to the encoding of BAB's within the frames P1, B1 and B2. Therefore, what mode signals are allocated to the BAB's, respectively, within the frames P1,B1 and B2 will be described below. It should be noticed here that in lieu of the mode signals, the encoded mode signals may be allocated to the BAB's within the frames P1, B1 and B2. For simplicity, only the case that mode signals are allocated thereto is described hereinafter.

In an intra mode, since the frame P1 is reconstructed based on the frame I (refer to the path 1 shown in FIG. 4), either the fist mode signal or the third mode signal is generated. Hence, either the first mode signal or the third mode signal is allocated to each of the BAB's within the frame P1 in the mode coding thereof. A mode signal allocated to each of the BAB's within the frame B1 is selected as a selected mode signal thereof from the first to fourth mode signals since the frame B1 can be reconstructed based on either the frame P2 (refer to the path 3 shown in FIG. 4) or the frame P1 which is a previous of the frame B1 (refer to the path 2 shown in FIG. 4).

And one of the first to fourth mode signals is allocated to each of the BAB's within the frame B2 in the mode coding thereof since the frame B2 can be reconstructed based on either the frame P3 (refer to the path 5 shown in FIG. 4) or the frame B1 which is a previous frame of the frame B2 (refer to the path 4 shown in FIG. 4).

As described above, in encoding a binary shape signal, e.g., a BAB within a frame (or a VOP), especially in enhancement layer coding of the binary shape signal, the mode coding method in accordance with the present invention can improve coding efficiency thereof significantly.

While the present invention has been described with respect to certain preferred embodiments only, other modifications and variations may be made without departing from the spirit and scope of the present invention as set forth in the following claims.

What is claimed is:

1. A mode coding method in encoding a binary alpha block (BAB) of M×N binary pixels within a current frame based on the current frame and a previous frame including a multiplicity of BAB's, M and N being positive integers, respectively, wherein each binary pixel has a binary value representing either an object pixel or a background pixel, comprising the steps of:

(a) performing sub-sampling on the BAB within the current frame according to a predetermined sub-sampling rule to thereby generate a sample block of (M/K)×(N/K) binary pixels within the current frame, wherein M and N are multiples of K which is a predetermined positive integer, respectively;

(b) generating a reconstructed BAB of M×N binary pixels according to a predetermined reconstruction rule based on the sample block within the current frame;

(c) evaluating the difference between the reconstructed BAB and the BAB within the current frame, then if there is no difference therebetween, generating a first mode signal informing that there is no difference therebetween and hence the difference is not coded, and if there is the difference therebetween, generating a second mode signal informing that there is the difference therebetween and at the same time generating a second error data block of M×N binary pixels representing the difference to be encoded as an encoded second error data block;

(d) in an inter mode, performing sub-sampling on the BAB's within the previous frame according to the predetermined sub-sampling rule to thereby generate a multiplicity of corresponding sample blocks of (M/K)×(N/K) binary pixels within the previous frame;

(e) in the inter mode, comparing the sample block within the current frame with the corresponding sample blocks within the previous frame and then detecting a corresponding second sample block most similar to the sample block within the current frame among the corresponding sample blocks within the previous frame as a predicted sample block to thereby produce a motion vector having vertical and horizontal components representing the displacement between the sample block within the current frame and the predicted sample block;

(f) in the inter mode, based on the motion vector, detecting a BAB most similar to the BAB within the current frame among the BAB's within the previous frame as a predicted BAB, evaluating the difference between the BAB within the current frame and the predicted BAB, then if there is no difference therebetween, generating a third mode signal informing that there is no difference therebetween and hence the difference is not coded, and if there is the difference therebetween, generating a fourth mode signal informing that there is the difference therebetween and at the same time generating a fourth error data block of M×N binary pixels representing the difference to be encoded as an encoded fourth error data block; and (g) in case that the BAB within the current frame is encoded in an intra mode, since one of the first and the second mode signals is generated in the step (c), providing the generated mode signal in the step (c) as a selected mode signal and in case that the BAB within the current frame is encoded in the inter mode, if one mode signal among the first to the fourth mode signals is produced in the steps (c) and (f), providing the produced mode signal in the steps (c) and (f) as a selected mode signal and if two mode signals among the first to the fourth mode signals are generated at the same time in the steps (c) and (f), selecting and providing one of the two generated mode signals in the steps (c) and (f) as a selected mode signal according to a first predetermined selection rule.

2. The method according to claim 1, wherein the current and the previous frames are replaced by a current video object plane (VOP) and a previous VOP, respectively.

3. The method according to claim 1, wherein the first predetermined selection rule is as follows: if the first and the third mode signals are generated at the same time, one of the first and the third mode signals is selected as the selected mode signal according to a second predetermined selection rule; if the first mode signal is generated and the third mode signal is not generated, the first mode signal is selected as the selected mode signal even though the fourth mode signal is generated at the same time; and if the third mode signal is generated and the first mode signal is not generated, the third mode signal is selected as the selected mode signal even though the second mode signal is generated at the same time; if the second and the fourth mode signals are generated at the same time, one of the second and the fourth mode signals is selected as the selected mode signal according to a third predetermined selection rule.

4. The method according to claim 3, wherein the third predetermined selection rule is as follows: the second and the fourth mode signals are encoded to thereby generate an encoded second and an encoded fourth mode signals, respectively and the second and the fourth error data blocks are encoded to thereby generate an encoded second and an encoded fourth error data blocks, respectively; and the encoded second and the encoded fourth mode signals and the encoded second and the encoded fourth error data blocks are combined to thereby generate encoded second and encoded fourth enhancement layer data, respectively; and then, second and fourth numbers of data bits for the encoded second and the encoded fourth enhancement layer data are calculated, respectively; thereafter, the second number of data bits is compared with the fourth number of data bits to thereby select the second mode signal as the selected mode signal if the second number of data bits is equal to or less than the fourth number of data bits and select the fourth mode signal as the selected mode signal if the second number of data bits is greater than the fourth number of data bits.

5. The method according to claim 4, wherein the second predetermined selection rule is that if the first and the third mode signals are generated at the same time, the third mode signal is selected as the selected mode signal.

6. The method according to claim 5, wherein if the first and the third mode signals are selected as the selected mode signals, respectively, the first and the third mode signals are encoded as the encoded first and the encoded third mode signals, respectively, and then the encoded first and the encoded third mode signals are provided as encoded enhancement layers, respectively; and if the second and fourth mode signals are selected as the selected mode signals, respectively, the encoded second and the encoded fourth enhancement layer data are provided as encoded enhancement layers, respectively.

7. The method according to claim 6, wherein the step (a) includes the steps of:

(a1) sampling every other horizontal lines of the BAB to generate a first block of (M/2)×N binary pixels starting from eithier a first or a second horizontal line of the BAB, wherein the first horizontal line is a topmost horizontal line of the BAB; and (a2) sampling every other vertical lines of the first block to generate the sample block of (M/2)×(N/2) binary pixels as a base layer starting from either a first or a second vertical line of the first block, wherein the first vertical line is a leftmost vertical line of the first block.

8. The method according to claim 7, wherein the step (b) includes the steps of:

(b1) generating a reconstructed first block of (M/2)×N binary pixels by inserting (N/2) number of reconstructed vertical lines sequentially at locations of vertical lines not sampled in the step (a2) under the condition that (N/2) number of vertical lines of the sample block are placed at locations of the vertical lines sampled in the step (a2), wherein the reconstructed vertical lines are produced according to a predetermined interpolation rule based on the vertical lines of the sample block; and (b2) producing the reconstructed BAB of M×N binary pixels by inserting (M/2) number of reconstructed horizontal lines sequentially at locations of horizontal lines not sampled in the step (a1) under the condition that (M/2) number of horizontal lines of the reconstructed first block are placed at locations of the horizontal lines sampled in the step (a1), wherein the reconstructed horizontal lines are produced according to a predetermined interpolation rule based on the horizontal lines of the reconstructed first block.

9. The method according to claim 8, wherein horizontal and vertical distances between the BAB within the current frame and the predicted BAB produced in the step (f) are two times the horizontal and vertical components of the motion vector, respectively.

10. The method according to claim 9, wherein the step (a1) is the step of sampling even-numbered horizontal lines of the BAB to generate the first block, and the step (a2) is the step of sampling even-numbered vertical lines of the first block to generate the sample block.

11. The method according to claim 10, wherein M is equal to N.

12. The method according to claim 11, wherein each of M and N is 16.

* * * * *